UNITED STATES PATENT OFFICE.

EDWARD C. RICE AND HENRY F. MONK, OF CRIPPLECREEK, COLORADO.

SOLDER.

SPECIFICATION forming part of Letters Patent No. 724,503, dated April 7, 1903.

Application filed May 10, 1902. Serial No. 106,787. (No specimens.)

*To all whom it may concern:*

Be it known that we, EDWARD C. RICE and HENRY F. MONK, citizens of the United States, residing at Cripplecreek, in the county of Teller and State of Colorado, have invented and produced a new and useful Composition, of which the following is a specification.

This invention relates generally to solders, and more particularly to a soft solder for soldering aluminium either to aluminium or for soldering aluminium to other metals. So far as we are aware all aluminium-solders heretofore employed have been what would be known as "hard" solders—that is, those which fuse only at high temperatures.

Our object is to provide a solder which can be used in connection with the ordinary soldering-iron and will fuse at the ordinary temperature and can be worked in substantially the same manner as ordinary tin-solder.

Another object of the invention is to provide a solder which withstands the action of the elements and one which will receive an exceedingly high polish or finish after the soldering operation has been accomplished.

With these various objects in view the invention consists in the combination of elements hereinafter fully described, and specifically pointed out in the claims.

In preparing a solder in accordance with our invention we employ certain elements, and by experiment we have ascertained that these elements can be combined in various proportions and that substantially the same results will be produced. We shall, therefore, briefly state the main features of our solder and then specifically point out several formulæ of composition.

Broadly speaking, our solder consists of a combination of tin, cadmium, zinc, mercurous chlorid, and magnesium chlorid, said elements being combined in certain proportions and melted with a flux and then molded into bars.

We will now specify several formulæ in preparing solder. In accordance with formula 1 we employ mercurous chlorid, fourteen parts; zinc, fifteen parts; cadmium, twelve parts; tin, eighteen and one-half parts.

Formula No. 2: Mercurous chlorid, nineteen parts; zinc, twenty parts; cadmium, fifteen and one-half parts; tin, sixteen and one-half parts. Cover same with borax and a thick layer of powdered charcoal, or, to make slag more liquid, equal parts of chicolite and barium chlorid.

Formula No. 3: Mercurous chlorid, twenty parts; cadmium, fourteen parts; tin, fourteen parts; zinc, twenty parts.

Formula No. 4: Mercurous chlorid, twenty-two parts; cadmium, fourteen parts; tin, twelve parts; zinc, nineteen parts. Cover with powdered borax and thickly cover with charcoal.

Formula No. 5: Magnesium chlorid, fifteen parts; mercurous chlorid, nineteen parts; zinc, twelve parts; cadmium, nine and one-half parts.

Formula No. 6: Mercurous chlorid, twenty parts; zinc, nineteen parts; cadmium, fourteen parts. These elements are covered with charcoal and heated slowly in Hessian crucibles and poured into molds.

The above formulæ will serve to illustrate the principles and 'chemical affinities involved; but we reserve the right to modify and vary the proportions of the ingredients according to circumstances and the use for which the solder is intended.

Having thus fully described our invention, what we claim as new, and desire to secure by Letters Patent, is—

1. An aluminium-solder resulting from the fusion of mercurous chlorid, cadmium, zinc, magnesium chlorid, and tin, substantially as specified.

2. An aluminium-solder resulting from the fusion of mercurous chlorid, nineteen parts, magnesium chlorid, fifteen parts, zinc twelve parts and cadmium nine and one-half parts.

EDWARD C. RICE.
HENRY F. MONK.

Witnesses:
JAMES M. PALMER,
LEE MARTIN.